(12) United States Patent
Prenzel

(10) Patent No.: US 11,267,550 B2
(45) Date of Patent: Mar. 8, 2022

(54) COMBINED SEAT/STAIR ARRANGEMENT FOR A MULTIDECK VEHICLE, IN PARTICULAR A MULTI-DECK AIRCRAFT OR SPACECRAFT

(71) Applicant: AIRBUS OPERATIONS GMBH, Hamburg (DE)

(72) Inventor: Eric Prenzel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 491 days.

(21) Appl. No.: 16/273,245

(22) Filed: Feb. 12, 2019

(65) Prior Publication Data

US 2019/0256187 A1 Aug. 22, 2019

(30) Foreign Application Priority Data

Feb. 16, 2018 (DE) ...................... 10 2018 202 427.8

(51) Int. Cl.
*B64C 1/24* (2006.01)
*B64D 11/06* (2006.01)
(Continued)

(52) U.S. Cl.
CPC .................. *B64C 1/24* (2013.01); *B64C 1/18* (2013.01); *B64D 11/06* (2013.01); *B64C 2001/0027* (2013.01)

(58) Field of Classification Search
CPC ..... B64C 1/24; B64C 1/18; B64C 2001/0027; B64C 1/20; B64D 11/06; B64D 11/0023; B61D 1/06; B61D 19/00; B61D 23/00
See application file for complete search history.

(56) References Cited

U.S. PATENT DOCUMENTS 5,395,075 A * 3/1995 Sprenger ................ B64D 11/00
182/77
6,659,225 B2 12/2003 Olliges et al.
(Continued)

FOREIGN PATENT DOCUMENTS

DE 42 23 320 C1 9/1993
DE 197 44 124 A1 4/1999
(Continued)

OTHER PUBLICATIONS

Translation of DE-19744124-A1 (Year: 1999).*
German Search Report for Application No. 10 2018 202 427.8 dated Aug. 13, 2018.

*Primary Examiner* — Richard R. Green
*Assistant Examiner* — Steven J Shur
(74) *Attorney, Agent, or Firm* — Jenkins, Wilson, Taylor & Hunt, P.A.

(57) ABSTRACT

A combined seat/stair arrangement for a multi-deck vehicle, in particular a multi-deck aircraft or spacecraft, include a foldable passenger seat; a stair which is designed to connect an upper deck to a lower deck via a stair hatch and at least one floor flap which movable between a use position of the stair with the stair hatch open and a use position of the foldable passenger seat with the stair hatch closed, wherein, in the use position of the foldable passenger seat, the at least one floor flap closes at least a partial region of the stair hatch, and wherein the floor flap is designed with a seat attachment, to which the foldable passenger seat is attached.

20 Claims, 4 Drawing Sheets

(51) Int. Cl.
*B64C 1/18* (2006.01)
*B64C 1/00* (2006.01)

(56) References Cited

U.S. PATENT DOCUMENTS

| | | | |
|---|---|---|---|
| 8,925,686 B2 | 1/2015 | Saint-Jalmes et al. | |
| 9,764,844 B2 * | 9/2017 | Le | B64D 11/0648 |
| 2012/0193472 A1 | 8/2012 | Guering et al. | |

FOREIGN PATENT DOCUMENTS

| | | | | |
|---|---|---|---|---|
| DE | 19744124 A1 * | 4/1999 | | B61D 1/06 |
| DE | 10 2013 101 928 A1 | 8/2014 | | |

* cited by examiner

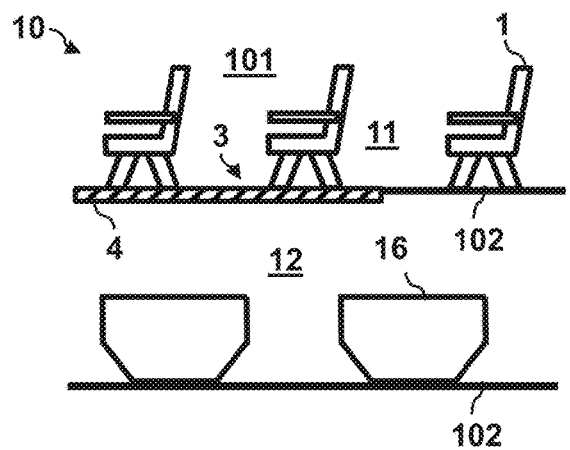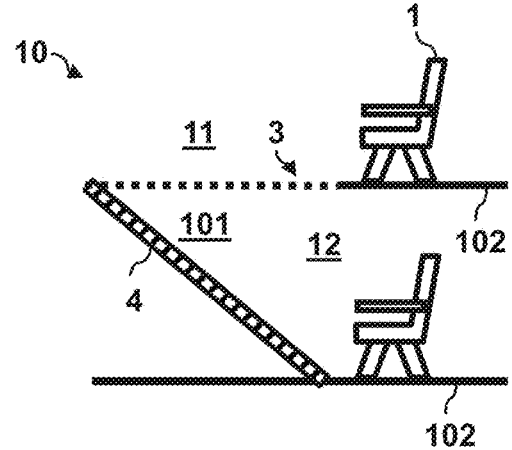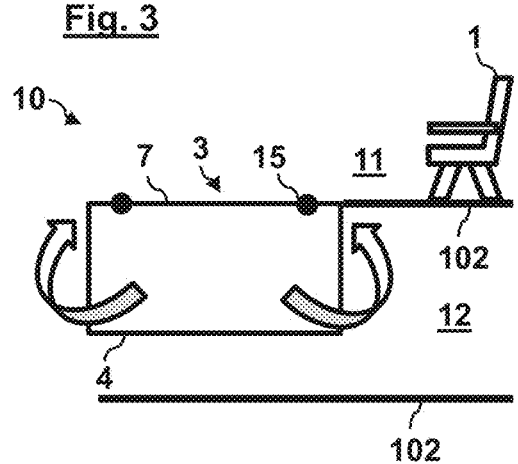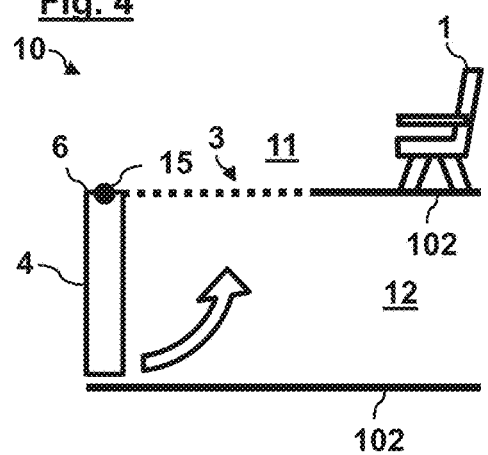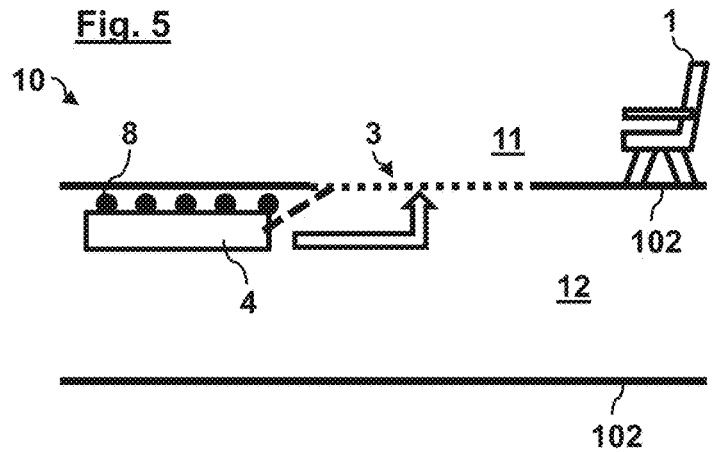

COMBINED SEAT/STAIR ARRANGEMENT FOR A MULTIDECK VEHICLE, IN PARTICULAR A MULTI-DECK AIRCRAFT OR SPACECRAFT

CROSS-REFERENCE TO RELATED APPLICATION

This application claims priority to German patent application DE 10 2018 202 427.8 filed Feb. 16, 2018, the entire disclosure of which is incorporated by reference herein.

TECHNICAL FIELD

The disclosure herein relates to a combined seat/stair arrangement for a multi-deck vehicle. In particular, the disclosure herein relates to a combined seat/stair arrangement for a multi-deck aircraft or spacecraft, and to a multi-deck aircraft or spacecraft with a combined seat/stair arrangement of this type.

Although usable in diverse applications, the disclosure herein and the problem on which it is based will be explained in more detail with regard to passenger aircraft. However, the described methods and devices can also be used in different vehicles and in all spheres of the transport industry, for example for road vehicles, for rail vehicles, for aircraft or for watercraft.

BACKGROUND

The fuselage of a typical passenger aircraft comprises one or two passenger decks in an upper region and a cargo deck located therebelow. In order to further improve the durability and economy of passenger aircraft, consideration has been given from time to time to providing additional passenger seats in the lower fuselage regions which have hitherto generally been reserved exclusively for accommodating cargo items. Depending on intended use and flight route, it may sometimes be advantageous in this regard if such a lower deck can be flexibly and rapidly reconfigured from a pure cargo deck to a combined cargo/passenger deck and/or to a pure passenger deck. For example, the lower deck of an aircraft may be required as a passenger deck for a certain flight since primarily passengers with light luggage, in particular hand luggage, are intended to be transported. For a different flight by the same aircraft, it may now be expedient to use the lower deck as a pure cargo deck.

In order to enable the passengers to have access from a lower passenger deck to an upper passenger deck, a stairway can be provided which can be easily and rapidly connected if the need arises. For example, the documents DE 4223320 C1, U.S. Pat. No. 8,925,686 B2, US 2012/0193472 A1 and U.S. Pat. No. 6,659,225 B2 describe various solutions for creating a stair connection between an upper and a lower deck, which stair connection can optionally be rapidly folded away or stowed in some other way.

SUMMARY

Against this background, the disclosure herein is based on an object of finding solutions for as flexible and space-saving an integration of a stair into a multi-deck vehicle as possible.

According to the disclosure herein, this object is achieved by a combined seat/stair arrangement and by a multi-deck aircraft or spacecraft with features disclosed herein.

According thereto, a combined seat/stair arrangement for a multi-deck vehicle, in particular a multi-deck aircraft or spacecraft, is provided. The combined seat/stair arrangement comprises a foldable passenger seat; a stair which is designed to connect an upper deck to a lower deck via a stair hatch; and at least one floor flap which is designed to be movable between a use position of the stair with the stair hatch open and a use position of the foldable passenger seat with the stair hatch closed, wherein, in the use position of the foldable passenger seat, the at least one floor flap closes at least a partial region of the stair hatch, and wherein the floor flap is designed with a seat attachment, to which the foldable passenger seat is attached.

Furthermore, a multi-deck aircraft or spacecraft is provided with a combined seat/stair arrangement according to the disclosure herein.

A concept on which the disclosure herein is based involves designing one or more floor flaps of a stair hatch as floor panels with corresponding structure for attaching seats. One or more foldable passenger seats can thus be attached to the floor flap and can be unfolded if the stair hatch is closed by the floor flap. For example, the floor flap can be designed as a customary cabin floor with attachment rails or the like as the attachment. With the aid of the disclosure herein, different configurations can be used in a particularly flexible and nevertheless space-saving manner. If the lower deck is not required as a passenger deck and/or a stair connection is not desired between the upper deck and the lower deck, the stair hatch can be closed by the at least one floor flap. In contrast to a variant with a fixedly installed staircase, the folding seats above the stair hatch can now be unfolded and used. If a stair is required, for example because the lower deck is intended to be used as a passenger cabin, the passenger seats can be folded up, the stair hatch opened and the floor flap folded back. In principle, different variants are provided here. For example, a stair can be mounted fixedly below the stair hatch. As soon as the stair hatch is opened, the stair can be immediately used. Alternatively, the stair can likewise be designed for releasable mounting on the stair hatch and only set up when it is also required. In further variants, the stair can be designed as a folding stair or the like similar to a loft ladder of a roof hatch, which stair can be extended from the stair hatch into the lower deck when required. For this purpose, the stair, for example, can be coupled fixedly to the floor flap and/or integrated therein. The at least one floor flap can completely or only partially close the stair hatch. In the latter case, for example, additional elements can be provided in order optionally to completely close the stair hatch, depending on use, e.g. further flaps, etc.

Foldable passenger seats within the context of the disclosure herein comprise passenger seats, folding seats and similar passenger seats which can be folded up and unfolded, can be attached in the customary manner to seat rails and seat attachments of this type and at the same time can be stowed in a space-saving manner by being folded onto the corresponding base.

Advantageous refinements and developments emerge from the description with reference to the figures.

According to a development, the at least one floor flap can be coupled to a transverse side or a longitudinal side of the stair hatch. A transverse side or longitudinal side of the stair hatch can be defined here with respect to a longitudinal direction of the vehicle, for example of a longitudinal axis of an aircraft. For example, the floor flap can be coupled via one or more hinges or the like to a front or rear transverse side of the stair hatch with respect to a longitudinal direction of the vehicle, and therefore the floor flap can be pivoted into the stair hatch and out of the stair hatch.

According to a development, the at least one floor flap can be coupled to the stair hatch in such a manner that the at least one floor flap can be pivoted from the use position of the foldable passenger seat to the use position of the stair into the upper deck or the lower deck. For example, the floor flap can be coupled to the stair hatch via a rotary joint, a rotary pivoting joint or a rotary tilting joint. Such a rotary pivoting joint or rotary tilting joint can have rotational and pivoting degrees of freedom that are independent of one another. For example, such a rotary pivoting joint can provide a degree of rotational freedom about a fixed rotation axis and a degree of pivoting or tilting freedom about a pivot axis which is oriented perpendicularly to the rotation axis.

According to a development, the at least one floor flap can be designed with running rails, and therefore the at least one floor flap can be pushed from the use position of the foldable passenger seat to the use position of the stair into the upper deck or the lower deck. For example, the running rails can be mounted on a ceiling of the lower deck adjacent to the stair hatch.

According to a development, in the use position of the stair, the at least one floor flap can form a handrail and/or a side wall of the stair. In this advantageous development, the floor flap can be coupled, for example, to the stair hatch in such a manner that the floor flap can be pivoted into the lower deck or the upper deck, with the floor flap in its final position forming a stair wall and/or a stair handrail of the stair.

According to a development, in the use position of the foldable passenger seat, the at least one floor flap can form a pressure barrier of a passenger cabin. For example, in this development, the lower deck can be used as a cargo deck, with the floor flap meeting all of the requirements regarding the pressure tightness between a passenger cabin and a cargo hold. For this purpose, the floor flap can be provided with corresponding lateral seals, etc.

According to a development, the seat attachment can be designed with a seat rail for attaching the foldable passenger seat. For example, the seat attachment can have one or more standardized seat rails made of metal and/or fiber-reinforced plastic, via which foldable passenger seats can be mounted onto the floor flap in the customary manner. In this development, the floor flap can be designed similarly to a customary vehicle floor, i.e. can comprise a plurality of floor panels with seat rails located inbetween.

According to a development, the seat attachment can be designed for attaching a plurality of foldable passenger seats. For example, the floor flap can be dimensioned in such a manner that two, three, four, five, six, seven, eight, nine or more foldable passenger seats can be attached thereto.

According to a development, the stair can be designed for repeatedly releasable attachment to the stair hatch. For example, the stair can be mounted on the stair hatch via suitable releasable holding devices, screw connections and/or rapid-action closures, such as plug-in, snap-action or click connections, etc. In this development, the stair can therefore easily be set up and removed in order to configure the seat/stair arrangement for corresponding applications. Alternatively, the stair can likewise be fixedly connected to the stair hatch and/or to the surrounding cabin floor, e.g. via a rivet connection.

According to a development, the stair can be designed as a folding stair and/or with stair steps which can be folded up. For example, the stair can be designed similarly to a loft ladder of a roof hatch with a plurality of stair elements which are displaceable or foldable against one another. Alternatively or additionally, stair steps which can be folded up can be provided.

According to a development, the stair can be integrated in the at least one floor flap. In a specific example, the floor flap can be designed on one side with unfoldable stair steps and on an opposite side with a seat attachment, such as one or more seat rails. For example, the floor flap can be correspondingly dimensioned such that it can be insertable into the stair hatch and partially or completely closes the latter here. In order to open the stair hatch, the floor flap can be raised out of the stair hatch, turned through 180° and attached with one end or one side to a transverse side or a longitudinal side of the stair hatch, for example via holding devices or the like specially provided for this purpose. The opposite end or the opposite side of the floor flap can then be placed onto a cabin floor of the lower deck. As soon as the stair steps are unfolded, the stair can be used by passengers and/or flight crew.

According to a development, the combined seat/stair arrangement can have at least two floor flaps and a movable transverse support. The movable transverse support can be extendable beyond the stair hatch in such a manner that, in the use position of the foldable passenger seat, the at least two floor flaps each rest on one side on the movable transverse support. In this development, the transverse support therefore serves as a support for the two or more floor flaps. For example, the movable transverse support can be manufactured from a fiber-reinforced plastics material, e.g. carbon-fiber-reinforced plastic (CFRP). For use of the stair, the movable transverse support can be pushed into a receptacle provided for this purpose in the floor of the upper deck. In order to bring the floor flaps into the use position of the foldable passenger seat or seats, the movable transverse support can be correspondingly extended out of the floor and latched in a further receptacle or attached in some other way, e.g. via a screw connection. The floor flaps can subsequently be folded onto the transverse support. In principle, it can be provided that the floor flaps are additionally mounted on the transverse support via (repeatedly) releasable connections.

According to a development, the combined seat/stair arrangement can be designed as a staircase. For example, one or more floor flaps can be provided which, in the use state of the stair, each form side walls and/or side handrails of the stair and ultimately of the staircase.

According to a development, the combined seat/stair arrangement can furthermore have a movable partition. The movable partition can be designed so as to be displaceable between the upper deck and the lower deck. In the use position of the foldable passenger seat, the movable partition can form a pressure barrier of a passenger cabin here. Alternatively or additionally, in the use position of the stair, the movable partition can form at least one out of the handrail and side wall of the stair here. The partition therefore advantageously combined different functions in the form of an individual structural wall.

The above refinements and developments can, if expedient, be combined with one another as desired. Further possible refinements, developments and implementations of the disclosure herein also comprise combinations not mentioned explicitly of features of the disclosure herein described previously or below with respect to the exemplary embodiments. In particular, a person skilled in the art will also add individual aspects as improvements or additions to the respective basic form of the disclosure herein.

BRIEF DESCRIPTION OF THE DRAWINGS

The disclosure herein will be explained in more detail below with reference to the example embodiments indicated in the schematic figures, in which:

FIGS. 2a-b show schematic sectional views of the combined seat/stair arrangement from FIGS. 1a-d in different installation states;

FIG. 3 shows a schematic sectional view of a combined seat/stair arrangement according to a further embodiment of the disclosure herein;

FIG. 4 shows a schematic sectional view of a combined seat/stair arrangement according to a further embodiment of the disclosure herein;

FIG. 5 shows a schematic sectional view of a combined seat/stair arrangement according to a further embodiment of the disclosure herein;

Figure 1A:
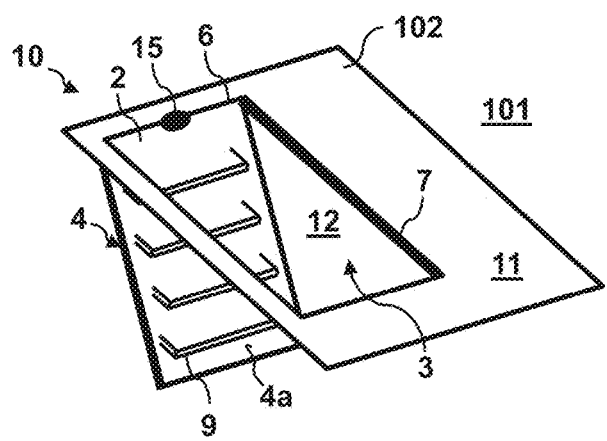
FIGS. 1a-d show schematic perspective views of a combined seat/stair arrangement in different installation states according to an embodiment of the disclosure herein.

The attached figures are intended to impart further understanding of the embodiments of the disclosure herein. They illustrate embodiments and serve in conjunction with the description to explain principles and concepts of the disclosure herein. Other embodiments and many of the advantages mentioned are apparent with respect to the drawings. The elements of the drawings are not necessarily shown true to scale with respect to one another.

DETAILED DESCRIPTION

In the figures of the drawing, identical, functionally identical and identically acting elements, features and components are each provided with the same reference signs—unless stated otherwise.

Figure 8:
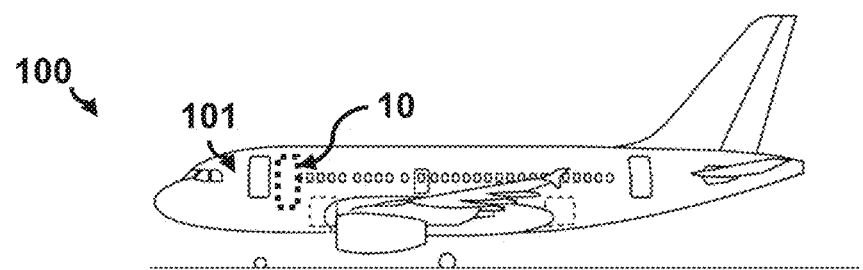
FIG. 8 shows a schematic side view of an aircraft with one of the combined seat/stair arrangements from FIGS. 1-7.

FIGS. 1a-d show schematic perspective views of a combined seat/stair arrangement 10 in different installation states according to an embodiment of the disclosure herein. The combined seat/stair arrangement 10 can be provided, for example, in the multi-deck aircraft 100 shown in FIG. 8. The aircraft 100 which is illustrated can be, for example, a passenger aircraft, for example a wide-body aircraft, which has a fuselage with an upper deck 11. Furthermore, below the upper deck 11, the aircraft 100 comprises a lower deck 12 which can be used as a cargo deck, as a passenger deck and/or as a combined cargo/passenger deck. In this example, the upper deck 11 can extend over the entire longitudinal extent of the fuselage. By contrast, the lower deck 12 can be divided, for example, into sections, for example a cargo deck section and a passenger deck section. The passenger decks are part of a pressure-tight passenger cabin 101 here. The embodiment shown of the aircraft 100 should be understood as being purely by way of example. It is likewise possible for, for example, further passenger decks to be provided, e.g. two upper passenger decks. Furthermore, the aircraft 100 can be designed as a narrow-body aircraft or general passenger aircraft.

The combined seat/stair arrangement 10 comprises a stair 2 which is designed to connect the upper deck 11 to the lower deck 12 via a stair hatch 3. For this purpose, FIG. 1a shows an installation state of the combined seat/stair arrangement 10, in which the stair 2 is coupled to a transverse side 6 of the stair hatch 3 via a joint 15, for example via a rotary joint, a rotary pivoting joint or a rotary tilting joint or the like. The stair 2 stands here with one end on a floor of the lower deck 12 (not shown), and therefore people can change to and fro between the upper deck 11 and the lower deck 12 via the stair 2. For this purpose, the stair 2 has a multiplicity of stair steps 9 which can be folded up into the stair 2.

Figure 1B:
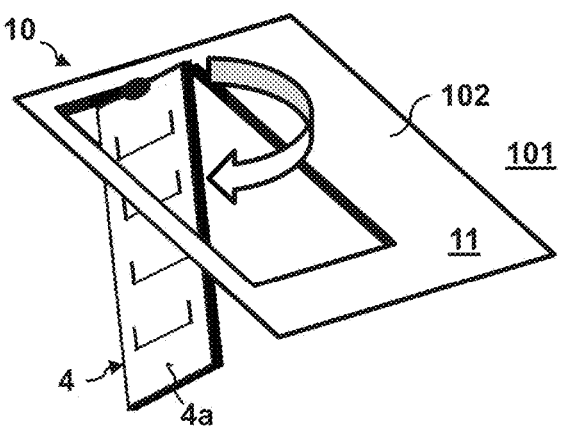
Figure 1C:
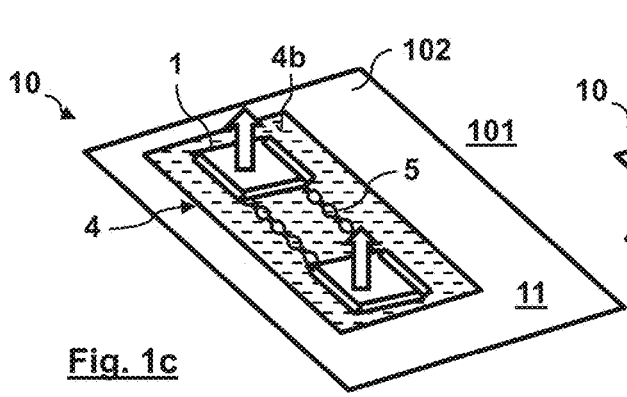
Figure 1D:
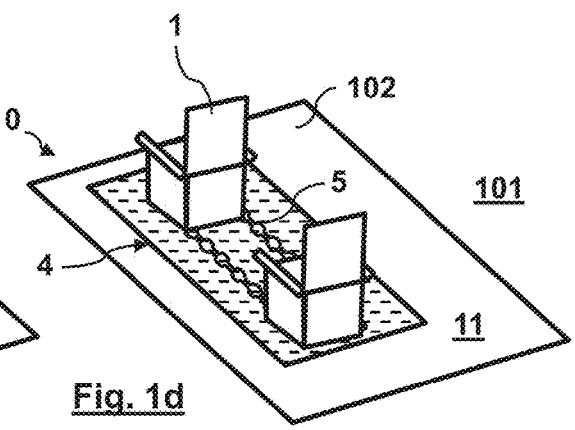

In the embodiment shown of the combined seat/stair arrangement 10, the stair 2 is integrated in a floor flap 4 which is designed to be movable between a use position of the stair 2 with the stair hatch 3 open and a use position of foldable passenger seats 1 when the stair hatch 3 is closed. FIGS. 1b-d each show individual installation steps in this regard during the change from the use position of the stair 2 to the use position of the foldable passenger seats 1. The stair steps 9 are first of all folded up. The floor flap 4 is then raised and turned through 180° about its longitudinal axis, as can be seen in FIG. 1b. The floor flap 4 is then inserted, in FIG. 1c, into the stair hatch 3, with the floor flap 4 being designed and dimensioned in such a manner that it completely closes the stair hatch 3. Furthermore, FIG. 1c shows that the floor flap 4 is designed as a floor panel with a seat attachment 5 in the form of two seat rails for the attachment of foldable passenger seats 1. Purely by way of example, two foldable passenger seats 1 are attached in the customary manner via the seat rails to the floor panel 4 in FIGS. 1c and d. The passenger seats are unfolded in FIG. 1c after the floor flap 4 is inserted into the stair hatch 3 and are then ready for use in FIG. 1d. In this example, the floor flap 4 is therefore formed on a stair side 4a with unfoldable stair steps 9 and on an opposite seat side 4b with a seat attachment 5.

This integrated variant of a stair floor flap affords the advantage that the lower deck 12 of the aircraft 100 can be rapidly and efficient reconfigured at any time. If the lower deck 12 is intended to be used as a cargo deck and/or no stair is desired between the upper deck 11 and the lower deck 12, the stair 2 can be removed in accordance with FIG. 1d. The area taken up by the stair hatch 3 can now be used for accommodating a plurality of foldable passenger seats 1 (cf. FIG. 1d). In this refinement, the floor flap 4 can be designed, for example, to close the upper deck 11 in a pressure-tight manner in relation to the lower deck 12. In other words, in this refinement, the floor flap 4 forms a pressure barrier of the passenger cabin 101. An arrangement of this type is shown in an exemplary sectional view in FIG. 2a. The lower deck 12 is closed off in a pressure-tight manner from the passenger cabin 101 of the upper deck 11 and serves for accommodating a multiplicity of containers 16 or other cargo items.

On the other hand, the stair 2 can be set up again at any time if the lower deck 12 is intended to be used as a passenger deck or if a stair projection between the upper deck 11 and the lower deck 12 is desired. For example, an aircraft 100 having only a regular passenger deck can thereby be converted into a double-deck aircraft 100 having a passenger cabin 101 which extends over an upper deck 11 and a lower deck 12 or over at least one portion of a lower deck 12. An arrangement of this type is shown in an exemplary sectional view in FIG. 2b. For this purpose, only the foldable passenger seats 1 are to be stowed on the floor flap 4 by being folded up. The floor flap 4 can subsequently be rotated corresponding to FIG. 1b and coupled to a transverse side 6 of the stair hatch 3. For the sake of clarity, the folded up passenger seats 1 are not shown in FIG. 2b and in the following figures.

FIGS. 3-6b show schematic sectional views of combined seat/stair arrangements 10 according to further embodiments of the disclosure herein. Unlike in the embodiment of FIGS. 1a-d, the stair 2 and the floor flap 4 here may be separate components. For example, in these embodiments, the stair 2 can be mounted fixedly on a transverse side or longitudinal side of the stair hatch 3 and arranged and/or designed in such a manner that the floor flap 4 can be moved past the stair 2 in order to open the stair hatch 3. Alternatively, however, the stair 2 can likewise be mounted in a (repeatedly) releasable manner on the stair hatch 3. For example, it can be provided that the stair 2 is removed when the stair hatch 3 is opened and the floor flap 4 is brought into the use position of the foldable passenger seats 1. In further embodiments which are not illustrated here, the stair 2 can be provided, for example, in the form of a folding stair or the like which can be extended and retracted in a similar manner to a loft ladder of a roof hatch. In a corresponding analogy, the floor flap 4 can be coupled like a roof flap to the stair 2, and therefore the two components can be opened and closed or extended and retracted in interaction with each other.

Figure 6A:
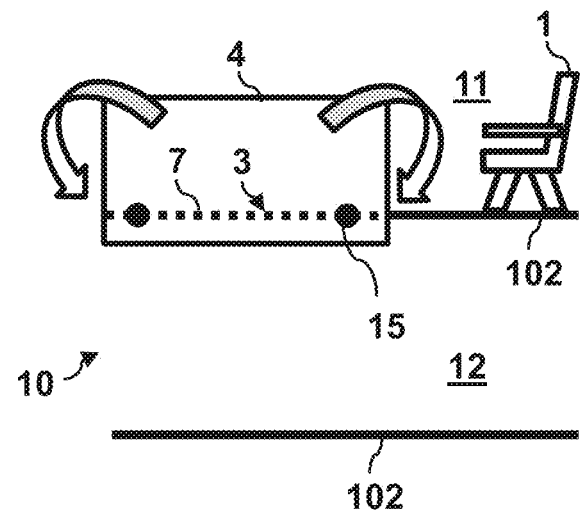
FIGS. 6a-b show schematic sectional views of a combined seat/stair arrangement according to a further embodiment of the disclosure herein.
Figure 6B:
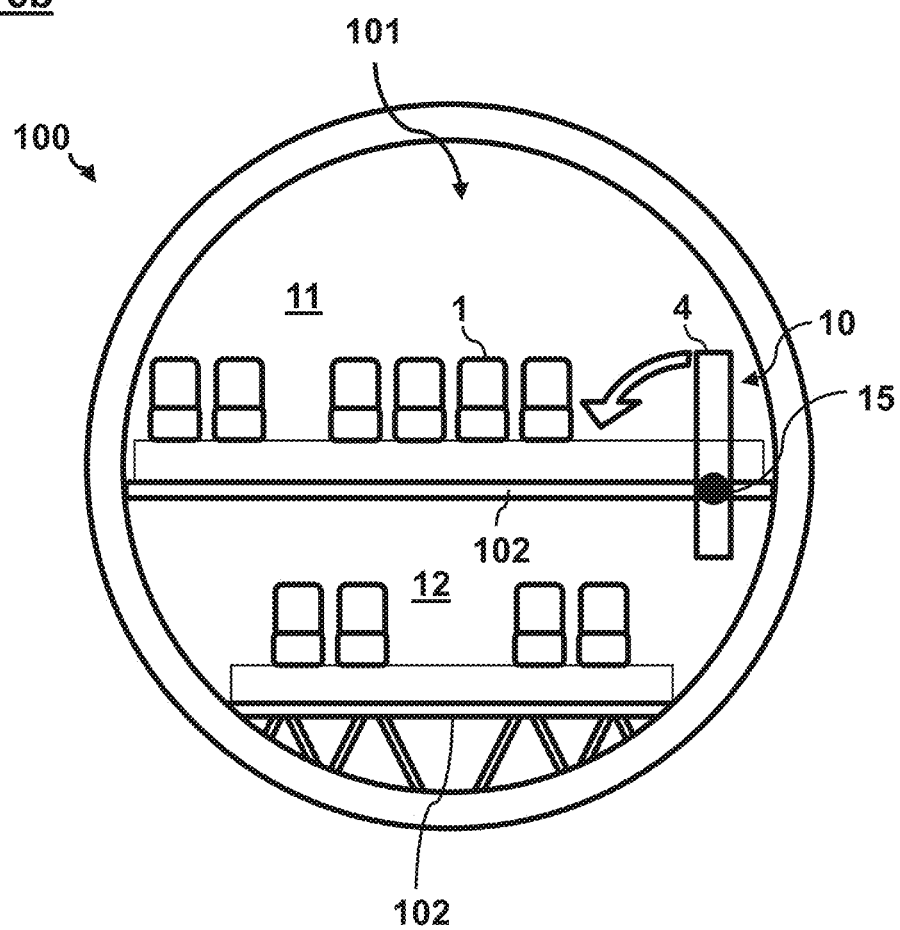

In the embodiments of FIGS. 3-6b, the floor flap 4 is coupled to the respective stair hatch 3 in a different manner. FIG. 3 shows an embodiment in which the floor flap 4 is connected to a longitudinal side 7 of the stair hatch 3 via two joints 15, for example hinges, in such a manner that the floor flap 4 can be pivoted from the use position of the foldable passenger seat 1 to the use position of the stair 3 into the lower deck 12 and back. Alternatively, FIG. 4 shows an embodiment in which the floor flap 4 is connected via a joint 15, such as a hinge or the like, to a transverse side of the stair hatch 3 and can correspondingly be moved to and fro via the joint 15 between the lower deck 12 and the stair hatch 3. FIG. 5 shows a further alternative embodiment. In this embodiment, the floor flap 4 is designed with running rails 8 via which the floor flap 4 can be pushed along a ceiling of the lower deck 12 from the stair hatch 3 into the lower deck 12. FIG. 6a finally shows a variant which is slightly modified in relation to FIG. 3 and in which the floor flap 4 is likewise coupled to a longitudinal side 7 of the stair hatch 3 via two joints 15. However, the rotation points of the hinges 15 are located in a lower region of the floor flap 4, and therefore the latter can be pivoted into the upper deck differently from the floor flap in FIG. 3. FIG. 6b shows the same embodiment in a sectional view transversely with respect to the longitudinal axis of the aircraft 100.

Figure 7:
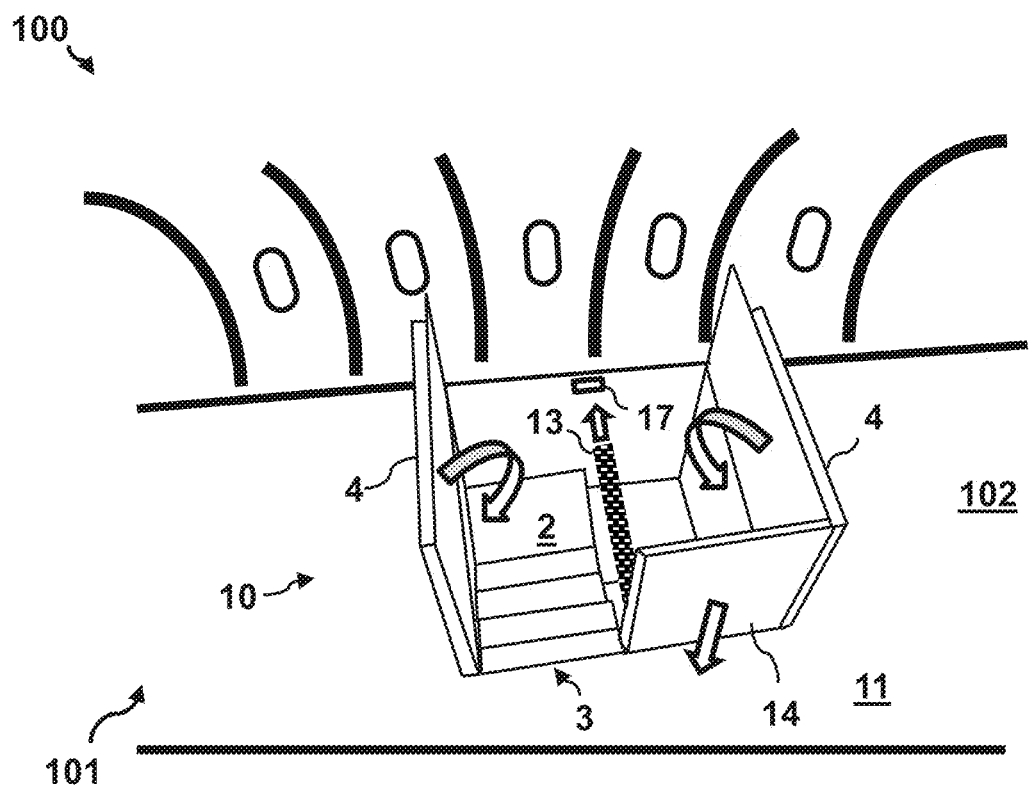
FIG. 7 shows a schematic perspective view of a combined seat/stair arrangement according to a further embodiment of the disclosure herein.

FIG. 7 shows a schematic perspective view of a combined seat/stair arrangement 10 according to a further embodiment of the disclosure herein. In this exemplary embodiment the seat/stair arrangement 10 is designed as a staircase which connects an upper deck 11 to a lower deck 12. The combined seat/stair arrangement 10 comprises, in this variant, two floor flaps 4 and a movable transverse support 13. The movable transverse support 13 is extendable from the cabin floor 102 and can be latched beyond the stair hatch 3 into a transverse support receptacle 17 on an outer side of the fuselage. Subsequently, the two floor flaps 4 can be folded into the stair hatch 3 such that the floor flaps in each case rest on one side on the movable transverse support 13. The two floor flaps 4, in this embodiment, are formed in a certain analogy to two wings of a trapdoor or the like. As in the embodiments of FIGS. 1-6b, these two floor flaps 4 are also designed with a seat attachment 5 in the form of one or more seat rails, via which foldable passenger seats 1 can be mounted on the closed floor flaps 4 (not depicted here). The foldable passenger seats 1 which are attached to the floor flaps 4 can be folded out or unfolded after the floor flaps 4 are folded up.

The seat/stair arrangement 10 of FIG. 7 furthermore comprises a movable partition 14 which is designed to be displaceable between the upper deck 11 and the lower deck 12. In the use position of the stair 2, the partition 14 forms a handrail or a side wall of the stair in the same manner as the floor flaps 4. However, in contrast to the floor flaps 4, the movable partition 14 is designed to be pushed vertically into the cabin floor 102. The movable partition 14 is arranged and designed here in such a manner that, in this case, a pressure barrier is created between the passenger cabin 102, i.e. the upper deck 11, and the lower deck 12.

Also in this embodiment, a combined seat/stair arrangement 10 is therefore provided which circumvents a reduction in the number of usable foldable passenger seats 1 by the area of the stairway or staircase being entirely used for accommodating foldable passenger seats 1 in the event that a lower deck 12 is not used as a passenger deck.

In the preceding detailed description, various features for improving the stringency of the illustration have been combined in one or more examples. However, it should be clear here that the above description is merely illustrative, and does not have a restrictive nature in any way. It serves to cover all the alternatives, modifications and equivalents of the various features and exemplary embodiments. Many other examples will be clear immediately and directly to a person skilled in the art on the basis of his/her specialist knowledge in view of the above description.

The exemplary embodiments have been selected and described in order to be able to present the principles underlying the disclosure herein and their application possibilities in practice as well as possible. As a result, specialist personnel can modify and use the disclosure herein and its various exemplary embodiments in an optimum way with respect to the intended purpose of use. In the claims and the description, the terms "including" and "having" are used as neutral terms for the corresponding terms "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBERS

1 Foldable passenger seat
2 Stair
3 Stair hatch
4 Floor flap
4a Stair side
4b Seat side
5 Seat attachment
6 Transverse side 7 Longitudinal side
8 Running rail
9 Stair step
10 Combined seat/stair arrangement
11 Upper deck
12 Lower deck
13 Movable transverse support
14 Movable partition
15 Joint
16 Container
17 Transverse support receptacle
100 Aircraft
101 Passenger cabin
102 Cabin floor

The invention claimed is:

1. A combined seat/stair arrangement for a multi-deck vehicle, in particular a multi-deck aircraft or spacecraft, the combined seat/stair arrangement comprising:
at least one floor flap, which comprises a floor panel with a seat attachment;
a foldable passenger seat attached to the at least one floor flap via the seat attachment; and
a stair to connect an upper deck to a lower deck via a stair hatch; and
wherein the at least one floor flap is movable between a use position of the stair, in which the stair hatch is open, and a use position of the foldable passenger seat, in which the stair hatch is closed; and
wherein, in the use position of the foldable passenger seat, the at least one floor flap is positioned within the stair hatch to close at least a partial region of the stair hatch.

2. The combined seat/stair arrangement according to claim 1, wherein the at least one floor flap is coupled to a transverse side or a longitudinal side of the stair hatch.

3. The combined seat/stair arrangement according to claim 1, wherein the at least one floor flap is coupled to the stair hatch such that the at least one floor flap can be pivoted from the use position of the foldable passenger seat to the use position of the stair into the upper deck or the lower deck.

4. The combined seat/stair arrangement according to claim 1, wherein the at least one floor flap comprises running rails, by which the at least one floor flap can be pushed from the use position of the foldable passenger seat to the use position of the stair into the upper deck or the lower deck.

5. The combined seat/stair arrangement according to claim 1, wherein, in the use position of the stair, the at least one floor flap forms at least one out of a handrail and a side wall of the stair.

6. The combined seat/stair arrangement according to claim 1, wherein, in the use position of the foldable passenger seat, the at least one floor flap forms a pressure barrier of a passenger cabin.

7. The combined seat/stair arrangement according to claim 1, wherein the seat attachment comprises a seat rail for attaching the foldable passenger seat.

8. The combined seat/stair arrangement according to claim 1, wherein the seat attachment is configured for attaching a plurality of foldable passenger seats.

9. The combined seat/stair arrangement according to claim 1, wherein the stair is configured for repeatedly releasable attachment to the stair hatch.

10. The combined seat/stair arrangement according to claim 1, wherein the stair is configured as a folding stair and/or with stair steps which can be folded up.

11. The combined seat/stair arrangement according to claim 1, wherein the stair is integrated in the at least one floor flap.

12. The combined seat/stair arrangement according to claim 1, wherein the at least one floor flap comprises at least a first floor flap and a second floor flap, as well as a movable transverse support, wherein the movable transverse support is extendable beyond the stair hatch such that, in the use position of the foldable passenger seat, the first floor flap is positioned such that a side of the first floor flap rests on the movable transverse support and the second floor flap is positioned such that a side of the second floor flap rests on the movable transverse support.

13. The combined seat/stair arrangement according to claim 12, wherein the first floor flap and the second floor flap are positioned such that the first floor flap is pivotable on a first edge of the stair hatch and the second floor flap is pivotable on a second edge of the stair hatch, the first and second edges being opposite edges of the stair hatch.

14. The combined seat/stair arrangement according to claim 13, wherein the transverse support is positioned within the stair hatch, between the first and second edges.

15. The combined seat/stair arrangement according to claim 14, wherein the transverse support is, when in a retracted position, positioned within a receptacle formed in the cabin floor and, when in an extended position, is extendable out of the receptacle of the cabin floor for latching into a transverse support receptacle that is positioned beyond the stair hatch on a fuselage of the aircraft or spacecraft.

16. A multi-deck aircraft or spacecraft with a combined seat/stair arrangement according to claim 1.

17. The combined seat/stair arrangement according to claim 1, wherein the stair comprises a plurality of stair steps, which are foldable against the at least one floor flap.

18. The combined seat/stair arrangement according to claim 17, wherein the floor flap comprises a stair side, to which the plurality of stair steps is pivotably attached, and a seat side, to which the seat attachment is attached.

19. The combined seat/stair arrangement according to claim 18, wherein the stair side is an opposite side of the floor flap from the seat side.

20. The combined seat/stair arrangement according to claim 1, comprising a movable partition displaceable between the upper deck and the lower deck, wherein, in the use position of the foldable passenger seat, the movable partition forms a pressure barrier of a passenger cabin, and/or wherein, in the use position of the stair, the movable partition forms at least one out of the handrail and a side wall of the stair.

* * * * *